Dec. 4, 1928.

P. W. FORSBERG 1,694,253

REGULATING SYSTEM

Filed Nov. 3, 1925

Inventor:
Peter W. Forsberg,
by
His Attorney.

Patented Dec. 4, 1928.

1,694,253

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

REGULATING SYSTEM.

Application filed November 3, 1925. Serial No. 66,618.

My invention relates to regulation of dynamoelectric machines and particularly to regulation for maintaining constant the voltage of a generator which is driven by a motor supplied from an electric circuit whose voltage varies over a wide range.

One object of my invention is to provide an improved voltage regulating arrangement for a variable speed generator whereby the voltage thereof is maintained constant irrespective of wide variations in the speed of the generator.

Another object of my invention is to provide an improved speed regulating arrangement for a motor generator set which is supplied from a variable voltage source, whereby the speed of the motor is controlled to maintain the voltage of the generator constant.

My invention will be better understood from the following description taken in connection with the accompanying drawing and its scope will be pointed out in the appended claims.

Figure 1:
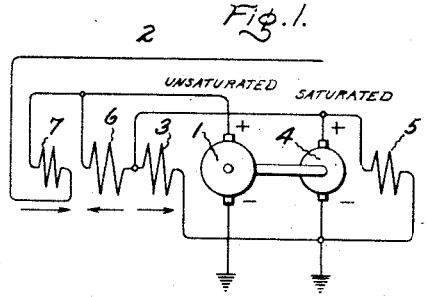
Figure 3:
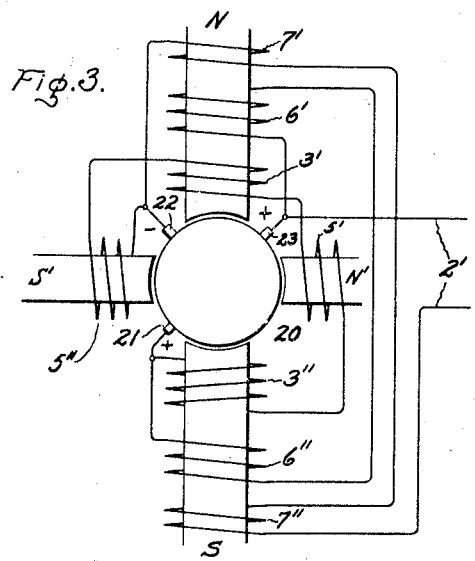
Figure 2:
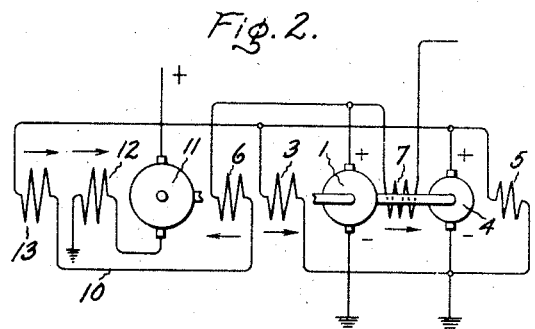
Figure 4:
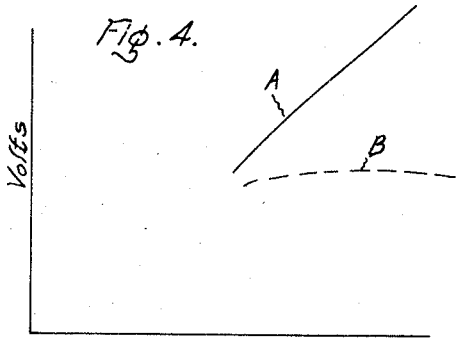

In the accompanying drawing Fig. 1 shows one embodiment of my invention for controlling the voltage of a variable speed generator; Fig. 2 shows a modification of the arrangement shown in Fig. 1 in which the generator whose voltage is to be maintained constant is driven by a motor supplied from a variable voltage source; Fig. 3 is a modification of the arrangement shown in Fig. 1 and Fig. 4 is an explanatory diagram.

Referring to Fig. 1, 1 represents a direct current generator which is arranged to be driven by means of a variable speed prime mover, not shown, and which is arranged to supply current to a load circuit having apparatus connected thereto which requires a substantially constant voltage to be impressed thereon in order to function properly. As shown the positive terminal of the generator 1 is connected to the supply conductor 2 of the load circuit and the negative terminal of the generator is connected to the ground which serves as the return conductor of the load circuit. My invention, however, is not limited to a load circuit having a ground return instead of a metallic return as it is evident that a metallic return may be used.

The generator 1 is provided with a field winding 3 which is excited by an exciter 4 arranged to be driven in any suitable manner at a speed proportional to the speed of the generator 1. As shown, the generator and the exciter which is provided with a shunt field winding 5 are connected to the same shaft.

The generator 1 is also provided with a field winding 6 which is connected between one terminal of the generator 1 and the corresponding terminal of the exciter 4 so that the voltage impressed thereon is the difference between the voltages of the generator and the exciter. As shown in the drawing, the winding 6 is connected between the positive terminals of the generator and exciter. This winding 6 is arranged so that it acts differentially with respect to winding 3 when the exciter voltage exceeds the generator voltage.

The generator 1 and exciter 4 are designed so that the generator is unsaturated and the exciter is saturated. I find that the best results are obtained by using a generator which operates just above the knee of the saturation curve at the lowest speed at which it is driven.

The operation of this system will be apparent from Fig. 4 which shows the voltage speed characteristic of the generator and the exciter. A is the exciter characteristic and B is the generator characteristic. It will be observed that as the speed varies the voltage between the two machines, which is impressed upon the winding 6, varies at a greater rate than the voltage of the exciter 4 which is impressed on the winding 3. Therefore, since the generator flux is equal to the flux produced by the winding 3 minus the flux produced by the winding 6, an increase in the generator speed effects a decrease in the generator flux and a decrease in the generator speed effects an increase in the generator flux. By properly designing the machines, the generator flux may be made to vary so that a substantially constant voltage is maintained with a wide variation in speed.

In order to compound the generator 1 for variations in the load supplied thereby, it may be desirable to provide the generator with a compound series winding 7 connected in series with the generator 1.

In the modification of Fig. 1 shown in Fig. 2, the generator 1 and the exciter 4, which are interconnected in the manner shown in Fig. 1, are driven by a series direct current motor 10 which is supplied from a source of current, the voltage of which varies over a considerable range. The motor 10 is provided with an armature 11, a series field winding 12, and a field winding 13 which is connected in series with the winding 6 of the generator 1 so that the voltage impressed thereon varies in accordance with the difference in the voltages of the generator and the exciter.

When the motor tends to speed up due to an increase in the voltage impressed thereon, an increased current flows through the field windings 6 and 13 from the positive terminal of the exciter to the positive terminal of the generator. Under these conditions, the current through the field winding 13 increases the excitation of the motor which tends to decrease the speed of the motor, and the current through the field winding 6 decreases the excitation of the generator so as to maintain the voltage of the generator constant in the manner heretofore described. When the voltage decreases so that the motor speed decreases, the reverse action takes place so that the excitation of the motor is decreased and the excitation of the generator is increased.

The arrangement shown in Fig. 2 has two important advantages, namely, a constant voltage generator and a motor which may be started as a series motor and which during its operation has a speed characteristic which is substantially the same as the speed characteristic of a shunt motor.

While I have shown the generator 1 and exciter 2 in Figs. 1 and 2 as being separate machines, it is evident that these two machines may be embodied in a single machine of the well known type having two sets of field poles which are arranged so that the flux in one set may be varied independently of the flux in the other set. In Fig. 3 I have combined the two machines 1 and 4 shown in Fig. 1 into a single machine 20. The poles N and S of the machine 20 are poles having a low flux density and the poles N' and S', are poles having a high flux density. The generator has three brushes 21, 22 and 23 which are so arranged that the voltage between the brushes 21 and 22 is the voltage produced in the armature winding by the poles N' and S' and the voltage between the brushes 22 and 23 is the voltage produced in the armature winding by the poles N and S. As shown, the brush 22 is the negative terminal and the brushes 21 and 23 are the positive terminals. On the poles N and S are wound the windings 3' and 3" respectively and on the poles N' and S' are wound the windings 5' and 5" respectively. These windings are connected across the brushes 21 and 22 and correspond to the windings 3 and 5 respectively of Fig. 1. On the poles N and S are wound the windings 6' and 6" respectively which are connected in series between the positive terminal 21 and the positive terminal 23, and the windings 7' and 7" respectively which are connected in series with the load circuit 2' connected across the terminals 22 and 23. These windings correspond respectively to the windings 6 and 7 of Fig. 1.

Therefore, it will be observed that the voltage between brushes 21 and 22 varies the same as the voltage of the exciter 4 in Fig. 1 when the speed changes, and the excitation of the poles N and S changes in the same manner as the excitation of the generator 1 in Fig. 1 so that the voltage across the brushes 22 and 23 remains substantially constant.

I wish it to be understood that while I call for a generator and an exciter in the appended claims, I intend that this terminology shall cover separate machines as shown in Figs. 1 and 2 as well as a single machine as shown in Fig. 3.

While I have shown and described several modifications of my invention, each of which embodies various devices diagrammatically indicated, changes and modifications will be obvious to those skilled in the art, and I, therefore, aim to cover in the appended claims all those modifications and changes as fall within the true spirit and scope of my invention.

What I claim as new and desire to secure by Letters Patent of the United States, is:—

1. In a voltage regulating system for a variable speed generator, an exciter driven at a speed proportional to the speed of said generator, and means for exciting said generator comprising a winding connected so as to be energized by the voltage of said exciter and a winding connected so as to be energized by the difference between the voltages of said exciter and generator.

2. In combination, a variable speed generator, a saturated shunt wound exciter driven at a speed proportional to the speed of said generator, a field winding for said generator connected so as to be energized by the voltage of said exciter, and a field winding for said generator connected so as to be energized by the difference between the voltages of said exciter and generator, said last mentioned field winding being arranged with respect to said first mentioned field winding so that it effects a decrease in the flux of said generator as the speed thereof increases.

3. In a voltage regulating system for a variable speed generator, a saturated shunt exciter driven at a speed proportional to the speed of said generator and means for exciting said generator comprising a winding excited by said shunt exciter, a compounding winding connected so as to be excited in accordance with the current output of said generator, and a differential winding connected so as to be excited by the difference between the voltages of said generator and said exciter.

4. In combination, an electric motor adapted to be supplied from a variable voltage source, a generator driven by said motor, an exciter driven by said motor, and means for regulating the speed of said motor and the voltage of said generator comprising field windings for said motor and generator connected so as to be energized by the difference between the voltages of said exciter and generator.

5. In combination, an electric motor adapted to be supplied from a variable voltage source, a generator driven by said motor, an exciter driven by said motor, means for exciting said generator comprising a winding excited by the exciter voltage and another winding connected to receive the difference between the voltages of said exciter and generator, and means for regulating the speed of said motor comprising a winding connected so as to be excited by the difference between the voltage of said exciter and generator.

6. In combination, a series direct current motor adapted to be supplied from a variable voltage source, a generator driven by said motor, a saturated shunt exciter driven by said motor, a field winding for said generator connected so as to be excited by the exciter voltage, a differential winding for said generator connected so as to be excited by the difference between the voltages of said exciter and generator, and a winding for said motor connected so as to be excited by the difference between the voltages of said exciter and generator.

In witness whereof, I have hereunto set my hand this twentieth day of October, 1925.

PETER W. FORSBERG.